United States Patent [19]
Segan et al.

[11] Patent Number: 5,708,883
[45] Date of Patent: Jan. 13, 1998

[54] TOY CAMERA

[76] Inventors: Marc H. Segan, 1192 Park Ave., New York, N.Y. 10128; Gary Strauss, 222 Union Ave., Mamaroneck, N.Y. 10543; Steven Parker, P.O. Box 512, One Tuxedo Rd., Tuxedo Park, N.Y. 10987

[21] Appl. No.: 727,945

[22] Filed: Oct. 9, 1996

[51] Int. Cl.[6] .......................... G03B 19/07; G03B 41/00
[52] U.S. Cl. .......................... 396/339; 396/335; 396/340; 396/395
[58] Field of Search .......................... 396/335, 336, 396/337, 338, 339, 340, 411, 471, 387, 322, 395

[56] References Cited

U.S. PATENT DOCUMENTS

| | | | |
|---|---|---|---|
| 3,069,987 | 12/1962 | Harrington | 396/335 |
| 3,598,035 | 8/1971 | Haller et al. | 396/335 |
| 3,687,040 | 8/1972 | Macone et al. | 396/337 |
| 3,772,977 | 11/1973 | Guccione | 396/336 |
| 4,101,913 | 7/1978 | Gallistel et al. | 396/335 |
| 4,751,537 | 6/1988 | Saita | 396/340 |
| 5,214,461 | 5/1993 | Sadre-Marandi | 396/338 |

*Primary Examiner*—A. A. Mathews
*Attorney, Agent, or Firm*—Cohen, Pontani, Lieberman & Pavane

[57] ABSTRACT

A multiple-image camera providing high-density use of conventional 35 mm film is disclosed. Many more individual exposures can be made using standard film and standard film processing services, which greatly reduces the cost of children's irratic and often unproductive experiments with photography. The mechanical simplicity of the camera make it both reliable and inexpensive, also make it useful as an expendable vacation camera for adults.

10 Claims, 2 Drawing Sheets

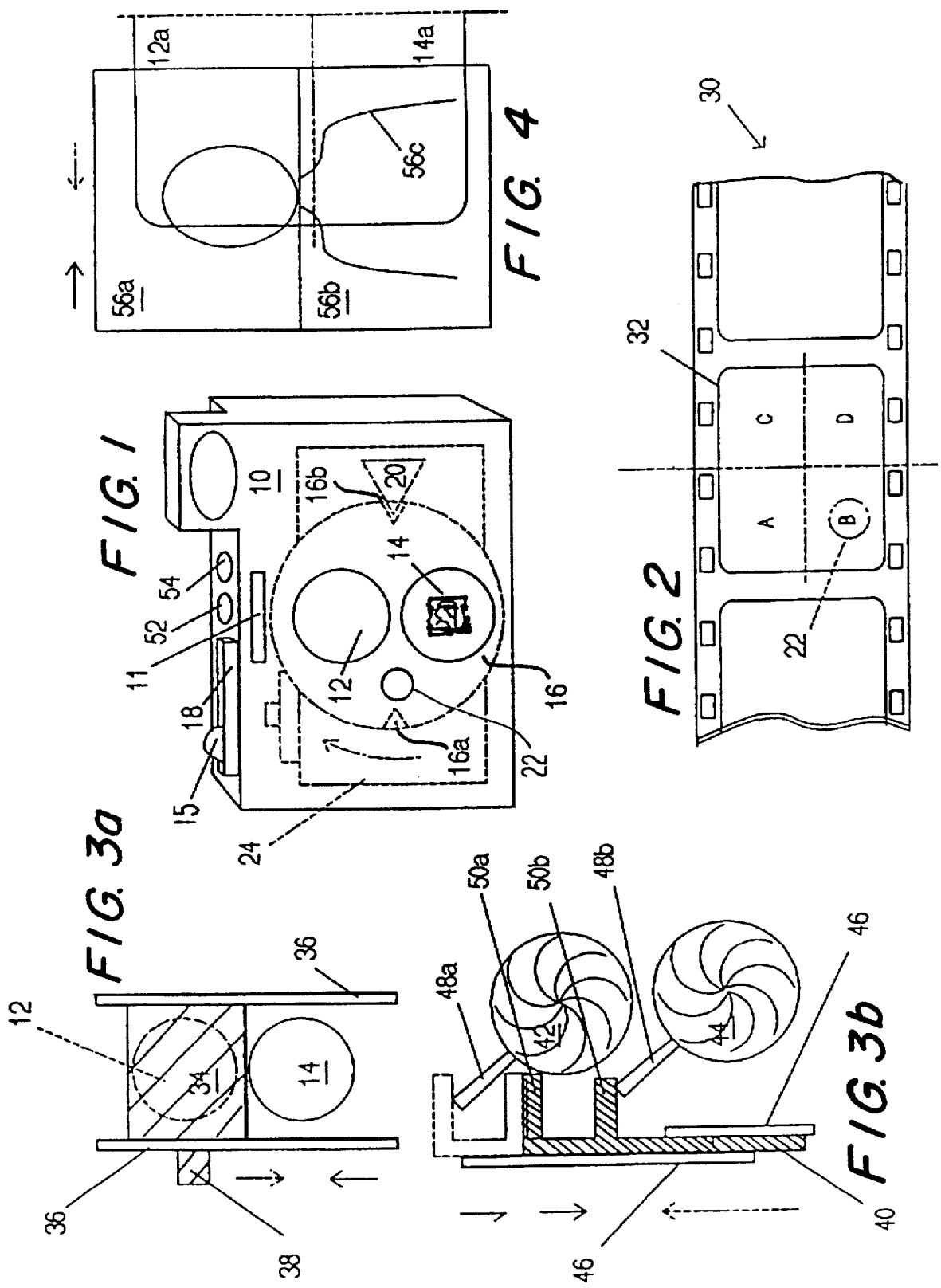

TOY CAMERA

BACKGROUND OF THE INVENTION

1. Field of the Invention

The present invention is related to photographic cameras. More particularly, the present invention is related to multiple-image photographic cameras.

2. Discussion of Related Art

Special-purpose multiple-image copy cameras that use multiple lenses or mirrors to expose multiple respective areas of film with the same image each time the film is advanced are well-known. Other multiple lens cameras have been designed to permit sequential exposure of multiple images.

For example, in U.S. Pat. No. 3,598,035 a multiple-shutter camera with a single turret-mounted lens automatically subdivides a sheet of Polaroid® film into four independently-exposed image areas. Alternatively, the camera back can be rotated relative to a single lens and single shutter to achieve the same result, as disclosed in U.S. Pat. No. 3,772,977.

Other cameras produce four images using four lenses and a rotating stop to automatically sequentially index the position of each exposed image. Alternatively, the cameras may slide two lenses across a baffle wall, from one half of the film plane to the other, to expose a third and fourth image before advancing the film, as disclosed in U.S. Pat. No. 5,214,461.

The cameras could be used to provide many more exposures within a given standard film format, but they are too expensive and too complicated for children to operate. This also makes them unsuitable for use as a reliable but "expendable" travel camera for vacationing adults.

SUMMARY OF THE INVENTION

In accordance with the present invention, many more individual exposures can be made using standard film and standard film processing services, which greatly reduces the cost of children's erratic and often unproductive experiments with photography. It also reduces the cost of vacation snapshots and the cost to a traveller of replacing a camera that becomes lost or stolen in transit.

The method and apparatus for multiple-exposure photography in accordance with the present invention provides a simple and economical way of recording more images on standard-format films. Quadrants of a standard-format frame are exposed sequentially by opening one of two lenses in alternation and advancing the film some fraction the width of the standard frame after each set of exposures is made by the lenses.

This method and apparatus provides many more simple, snapshot-type images on a single roll of standard film, without the expensive, specialized long-roll film formats and bulk-capacity film carriers designed for professional photographers. This is particularly advantageous for use by children, who tend to take as many pictures of the floor, their thumb and other unintended objects as they do of more satisfactory subjects, such as friends and pets. Obtaining four times more prints for the same cost as that of an ordinary roll of film is advantageous. The four prints within each frame can be cut apart as wallet-size pictures or sorted and mounted in a scrap book, as a craft project. Those that are particularly successful can be selectively enlarged by a photodeveloper, using the original negative.

The multiple-image camera provided in accordance with the present invention is much simpler and more durable than multiple exposure systems that rotate the camera's film drive under the shutter mechanism or rotate a turret-mounted lens, and much less expensive than using four lenses, one for each quadrant.

A camera in accordance with a preferred embodiment of the present invention has two fixed lenses and a movable aperture that selects which lens will expose the image. The camera's film advance mechanism moves the film in a direction that is orthogonal to the lens axis to provide suitable longitudinal spacing between pictures.

In one embodiment a rotating aperture disc selects which lens will expose the image. In a particular embodiment the disc carries a single aperture and completes a half rotation after each image is exposed.

In another embodiment a reciprocating aperture mask blocks off light from each one of the lenses, in alternation to select which lens will expose the image.

The film advance mechanism preferably provides half-frame advance for standard 35-mm film.

BRIEF DESCRIPTION OF THE DRAWINGS

The features and advantages of the present invention will be better understood when the detailed description of a preferred embodiment given below is considered in conjunction with the figures provided, wherein:

FIG. 1 is a perspective view of a multiple-exposure camera in accordance with the present invention;

FIG. 2 is a diagram of a multiple-exposure format for 35-mm film in accordance with a preferred embodiment of the present invention;

FIGS. 3a and 3b are plan views of alternative embodiments of the lens selection mechanism;

FIG. 4 is a schematic representation of a two-part viewfinder template for use with a multiple-exposure camera constructed in accordance with the present invention.

In these drawings, similar structures are assigned like reference numerals.

DETAILED DESCRIPTION OF A PREFERRED EMBODIMENT

Figure 3C:
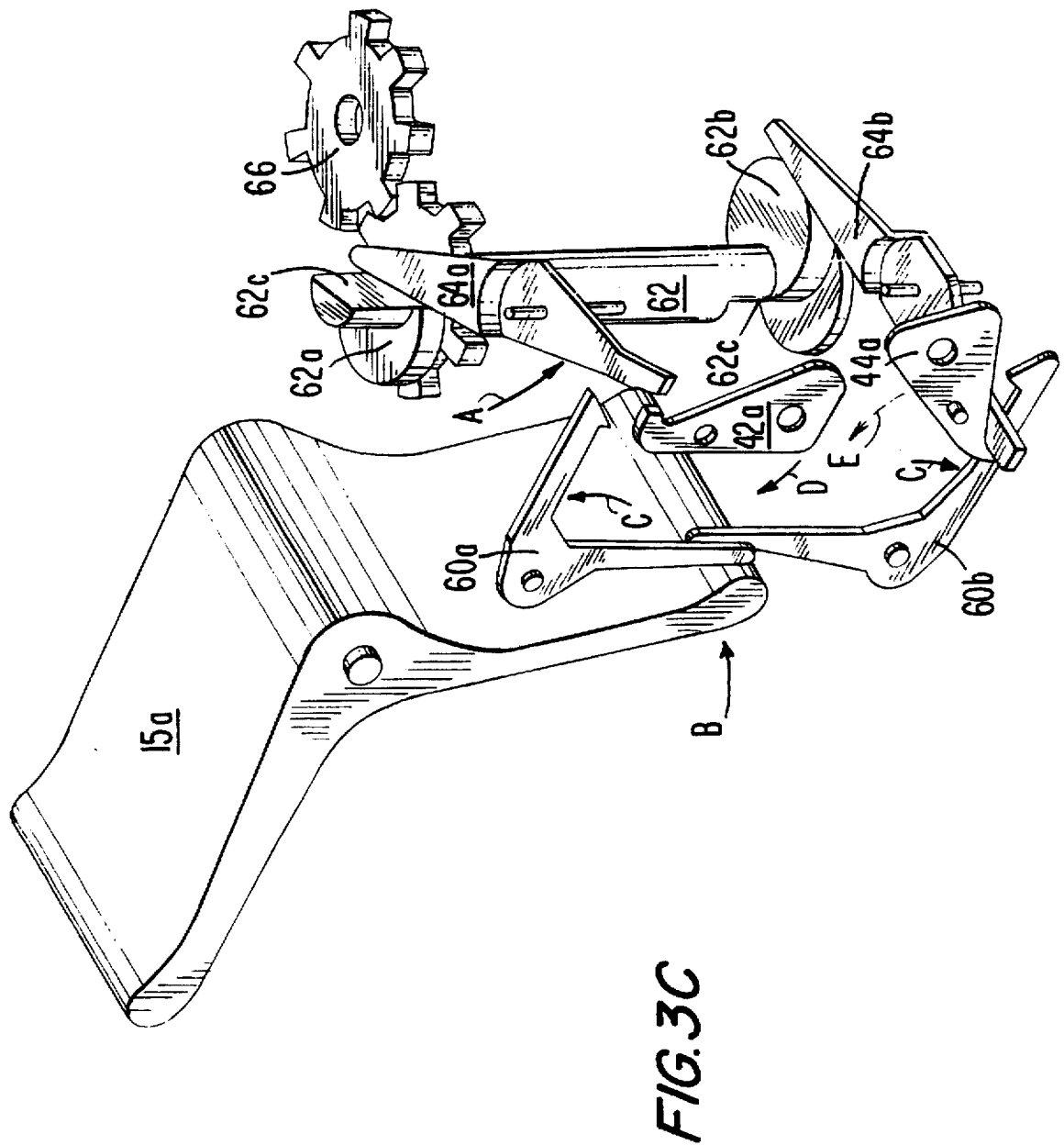
FIG. 3c is a perspective view of a third embodiment of a further embodiment of the lens-selection mechanism showing the shutter and film-advance linkages.

FIG. 1 shows the exterior of a multiple exposure camera 10 in accordance with the present invention, having a viewfinder lens 11, two taking lenses 12, 14 and a shutter release button 15. Behind the two taking lenses 12, 14, and their respective shutters (not shown) is a rotatable aperture plate 16 (shown in phantom), rotated by actuation of a film advance lever 18. The plate 16 has two index notches 16a, 16b that engage a sense arm 20 to stop rotation of the plate 16 when the aperture opening 22 in the plate 16 is not aligned with one of the lenses 12, 14. Rotary drive is provided by the film advance lever 18 in one of the suitable ways well-known in the art. Indicators 52, 54 show the user which lens 12, 14 will make the next exposure.

FIG. 2 shows the array of images A, B, C, D, produced by the multiple-exposure camera of FIG. 1 on a standard-format roll 24 of 35-mm film 30. Quadrant A of the standard 35-mm frame 32 is exposed by lens 12 when the sense arm 20 is disengaged and the plate 16 rotates passing the aperture 22 in front of lens 12. After an image is exposed in quadrant A, the photographer actuates a film advance lever in a conventional manner. However, the first time that film advance lever 18 is actuated it does not advance the film; it merely causes plate 16 to rotate automatically until the arm 20 engages notch 16b, as shown in FIG. 1.

After quadrant B is exposed, actuation of the film advance lever advances the film by approximately one-half the standard 35-mm film-advance distance. This second actuation of the film advance lever 18 also rotates the other notch 16a into engagement with the sensor arm 20. A subsequent actuation of the lever 18 advances plate 16 to next notch 16b to be ready for exposing quadrant D, after quadrant C is exposed, and so on. In this way a standard aspect ratio is substantially maintained for the image in each quadrant of the frame, for convenience in printing and filing the photos. Also the operation of the quadrature division of the film is accomplished, conveniently without specific user intervention. FIGS. 3a and 3b show alternative ways in which the upper and lower lenses 12, 14 can be alternately selected.

In FIG. 3a, a movable baffle 34 slides along guide rails 36. The movable baffle 34 alternately covers and uncovers each of the lenses 12, 14 as the tab 38 on the baffle 34 is driven alternately up and down by each actuation of the film advance lever 18.

In FIG. 3b the lens 12, 14 used for making each exposure is selected by a sequential actuator 40 that trips the top shutter 42 when the shutter-release button 15 is pressed for the first time. The top shutter 42 is tripped when the trip lever 48a of the top shutter 42 is momentarily displaced downward by a short downward throw of the upper actuator extension 50a, initiated by the shutter-release button 15, from the position of the actuator 40 shown in phantom to the shaded position of that actuator 40. The short downward throw of the upper actuator extension 50a can be provided by suitable means that are well-known in the shutter art. The next time the shutter-release button 15 is pressed, trip lever 48b of the bottom shutter 44 is momentarily displaced downward by the downward movement of the lower actuator extension 50b, and the next actuation of the film advance lever 18 resets the sequential actuator 40 to the upper position shown in phantom, ready to trip the top shutter 42.

In FIG. 3c, a hole in each of the shutters 42a, 44a pivots across the aperture 22 for each respective lens 12, 14, when each shutter is released by a respective trip arm 60a, 60b. The shutter 42a, 44a, however, can only be released when the respective pivoting shutter-lock lever 64a, 64b is in contact with a respective dwell surface 62c on the shutter selection assembly 62.

For example, in FIG. 3c, the film advance mechanism, here represented by a gear 66, has rotated the shutter selection mechanism 62 by 180° in direction "A". The shutter release button 15a has been pressed as shown by arrow "B". This releases both trip levers 60a, 60b so that they swing away as shown by arrows "C". However, even though both trip levers 60a, 60b have released the shutters 42a, 44a in FIG. 3c, only the upper shutter 42a will move, as shown by arrow "D". The other shutter 44a is prevented from moving as indicated in phantom by arrow "E" by the shutter lock lever 64b.

In this mechanism, it will also be apparent to one skilled in the art that the shutter selection assembly 62 that actuates the lock levers 64a, 64b by contact with the respective cam surfaces 62a, 62b and dwell surfaces 62c can be used to actuate the lens selection indicators 52, 54.

FIG. 4 illustrates an incidental entertainment feature of a multiple exposure camera advantageously constructed and operated in accordance with the present invention. Indicators 52, 54, that show which lens aperture will make the next exposure are used to position the subject accordingly in the viewfinder lens 11. The scene framed by the viewfinder lens 11 (FIG. 1) for each exposure 12a, 14a can then be adjusted so that a comical or satirical conjugate image is obtained. If a friend's face is framed in the viewfinder lens 11 so that it extends to the lower edge of the top quadrant 12a of the frame 32 when that quadrant is exposed, a circus performer's torso could be subsequently be exposed at the top edge of the bottom quadrant 14a, thereby automatically splicing the two exposures together.

A two-part alignment-reference template 56a, 56b providing an outline through which the image seen in the camera's viewfinder lens 11 can be seen, as a scaling and position reference may be used to provide more reliable alignment. The operator would then have the option of inserting the corresponding portion of the alignment template 56a, 56b behind the viewfinder lens 11 when the taking lens 12, 14 making the next exposure is selected by the aperture disc 16, before each scene is photographed by the operator.

The invention has been described with particular reference to a presently preferred embodiment of the invention. However, it will be immediately apparent to one skilled in the art that other variations and modifications thereof are possible within the spirit and scope of the present invention. For example, the film advance mechanism may be motorized and automatically actuate the shutter selection assembly after each exposure is made.

What is claimed is:

1. A camera for recording multiple sequentially exposed images on a single film frame on a strip of film having a multiplicity of unexposed film frames, said camera comprising:

first and second lenses each defining an imaging axis therethrough for receiving images to be recorded on the film;

the film being disposed in said camera with one of the unexposed film frames in alignment with said axes and orthogonal thereto for recording images thereon;

an articulable film advance mechanism operable for longitudinally advancing the strip of film for a distance of one-half of a film frame in a direction orthogonal to said lens axes so as to provide longitudinal alignment of the images exposed through said lenses and a one-half film frame; and means for selectively exposing respective portions of said aligned one-half film frame by each of said lenses before said film advance mechanism is operated to advance the film to a successive one-half film frame so that images are recorded on the film through both of said lenses each time the film is advanced by said film advance mechanism to a successive one-half film frame.

2. The camera of claim 1, further comprising means for aligning a first object from a first scene in said first lens for exposure on a first quadrant of the film frame in the aligned one-half film frame and for aligning a second object from a second scene in said second lens for exposure on a second quadrant of the film frame in the aligned one-half film frame, said second quadrant being immediately adjacent said first quadrant so that said first object and said second object are exposed and appear on the film as a single area unitarily forming a single combined image in the aligned one-half film frame.

3. The camera of claim 1, wherein said film advance mechanism comprises means for advancing the film one-half of a film frame every other time said mechanism is actuated.

4. The camera of claim 1, wherein said film exposure means is a rotating aperture disc, said disc selectively permitting one of said lenses to expose said film at a time.

5. The multiple-image camera of claim 4 wherein said disc carries a single aperture and completes a half rotation after each image is exposed.

6. The camera of claim 1, wherein said film exposure means includes a shutter selection lever, said shutter selection lever permitting only one of said lenses to expose said film at a time.

7. The camera of claim 6, wherein said shutter selection lever is disposed to be actuated when said film advance mechanism is actuated.

8. The camera of claim 1, further comprising a selected-lens indicator.

9. A method of recording multiple sequentially exposed images on a single film frame on a strip of film having a multiplicity of unexposed film frames in a camera having multiple lenses each defining an imaging axis therethrough, said method comprising the steps of:

(a) aligning the film strip in a first position in which a first half of a film frame is aligned with a lens axis of each of a first and a second lens of the camera;

(b) exposing a first scene onto a first portion of said film frame first half using said first lens with the film strip in said first position;

(c) exposing a second scene onto a second portion of said film frame first half using said second lens with the film strip in said first position;

(d) after said steps (b) and (c), moving the strip of film to a second position a distance from said first position of one-half of a film frame in a direction orthogonal to said lens axes so as to align said lens axes of each of said first and said second lenses with a second half of the film frame; and (e) repeating steps (b)–(c) with said film strip in said second position so as to expose third and fourth scenes on first and second portions of said film frame second half and thereby expose multiple images on each one-half of the film frame in an array orthogonal to the movement of the film.

10. The method of claim 9, further comprising the step of:
aligning a first object from a first scene in said first lens for exposure on a first quadrant of the film frame and a second object from a second scene in said second lens for exposure on a second quadrant of the film frame, said second quadrant being adjacent said first quadrant so that said first object and said second object are exposed and appear on the film as a single area unitarily forming a single combined image on the aligned one-half film frame.

* * * * *